United States Patent
Kim et al.

(10) Patent No.: US 8,997,212 B2
(45) Date of Patent: Mar. 31, 2015

(54) IMAGE FORMING APPARATUS TO EXECUTE USER AUTHENTICATION AND METHOD OF EXECUTING USER AUTHENTICATION IN IMAGE FORMING APPARATUS

(75) Inventors: Byoung-yue Kim, Suwon-si (KR); Sun-kye Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 142 days.

(21) Appl. No.: 13/152,439

(22) Filed: Jun. 3, 2011

(65) Prior Publication Data

US 2012/0054854 A1 Mar. 1, 2012

(30) Foreign Application Priority Data

Aug. 24, 2010 (KR) ........................ 10-2010-0082089

(51) Int. Cl.
```
G06F 7/04      (2006.01)
H04N 1/44      (2006.01)
G03G 21/04     (2006.01)
G06F 21/12     (2013.01)
H04N 1/00      (2006.01)
G03G 15/00     (2006.01)
G06F 21/31     (2013.01)
G06F 21/60     (2013.01)
G06F 21/62     (2013.01)
```
(52) U.S. Cl.
CPC ........... *H04N 1/4413* (2013.01); *H04N 1/4433* (2013.01); *G03G 21/04* (2013.01); *G06F 21/121* (2013.01); *H04N 1/00411* (2013.01); *H04N 1/00413* (2013.01); *H04N 1/00474* (2013.01); *H04N 1/0048* (2013.01); *H04N 1/00514* (2013.01); *G03G 15/5016* (2013.01); *G06F 21/31* (2013.01); *G06F 21/608* (2013.01); *G06F 21/629* (2013.01); *H04N 2201/0094* (2013.01)
USPC ................ 726/19; 726/27; 713/168; 713/183

(58) Field of Classification Search
None
See application file for complete search history.

(56) References Cited

U.S. PATENT DOCUMENTS 6,243,816 B1    6/2001   Fang et al.
7,313,699 B2 *  12/2007  Koga ........................... 713/170

(Continued)

FOREIGN PATENT DOCUMENTS

JP    09-034324     2/1997
JP    2007-058546   3/2007

(Continued)

OTHER PUBLICATIONS

European Search Report dated Mar. 5, 2014 issued in EP Application No. 11169078.0.

*Primary Examiner* — Kaveh Abrishamkar
(74) *Attorney, Agent, or Firm* — Staas & Halsey LLP

(57) ABSTRACT

An image forming apparatus to execute user authentication includes an input unit through which user information is input, and an account management unit to manage an account information database. The account information database stores user information corresponding to functions of the image forming apparatus. The image forming apparatus further includes a user authentication unit to execute user authentication based on the user information input through the input unit by using the account information database, and a display unit to display a user interface where a function corresponding to the input user information is activated, in response to a result of the authentication.

15 Claims, 6 Drawing Sheets

| | ID | BASIC PASSWORD | AUXILIARY PASSWORD 1 | AUXILIARY PASSWORD 2 | AUXILIARY PASSWORD 3 | AUXILIARY PASSWORD 4 |
|---|---|---|---|---|---|---|
| CONTENTS | USER 1 | XXXYY | 325BXY | 473AB | AAA | 350ABC |
| BYNAME | | | Public Password | Basic Password | Short Password | Secure Password |
| FUNCTION 1 | | √ | | | | |
| FUNCTION 2 | | | | √ | | |
| FUNCTION 3 | | | √ | | | |
| FUNCTION 4 | | | | | √ | |
| FUNCTION 5 | | | | | | √ |

400

(56) References Cited

U.S. PATENT DOCUMENTS

| | | | |
|---|---|---|---|
| 7,990,552 B2 * | 8/2011 | Kouno | 358/1.13 |
| 8,174,724 B2 * | 5/2012 | Kitora et al. | 358/1.18 |
| 8,264,709 B2 * | 9/2012 | Okajima et al. | 358/1.14 |
| 8,446,621 B2 * | 5/2013 | Nuggehalli et al. | 358/1.15 |
| 2003/0081247 A1 * | 5/2003 | Sharma | 358/1.15 |
| 2005/0071645 A1 | 3/2005 | Girouard et al. | |
| 2006/0126100 A1 | 6/2006 | Jung | |
| 2006/0143706 A1 * | 6/2006 | Kawasaki et al. | 726/19 |
| 2006/0221377 A1 * | 10/2006 | Nishio | 358/1.14 |
| 2007/0177920 A1 * | 8/2007 | Katano et al. | 400/76 |
| 2008/0016450 A1 * | 1/2008 | Aono | 715/747 |
| 2008/0201775 A1 | 8/2008 | Kai | |
| 2008/0297829 A1 | 12/2008 | Paek | |
| 2009/0300755 A1 | 12/2009 | Pakhunov | |
| 2010/0005525 A1 | 1/2010 | Fischer | |
| 2010/0328723 A1 | 12/2010 | Kamekawa | |

FOREIGN PATENT DOCUMENTS

| | | |
|---|---|---|
| JP | 2008-204204 | 9/2008 |
| WO | 98/51029 | 11/1998 |
| WO | 2009/130980 | 10/2009 |

\* cited by examiner

| | ID | BASIC PASSWORD | AUXILIARY PASSWORD 1 | AUXILIARY PASSWORD 2 | AUXILIARY PASSWORD 3 | AUXILIARY PASSWORD 4 |
|---|---|---|---|---|---|---|
| CONTENTS | USER 1 | XXXYY | 3258XY | 473AB | AAA | 350ABC |
| BYNAME | | | Public Password | Basic Password | Short Password | Secure Password |
| FUNCTION 1 | | √ | | | | |
| FUNCTION 2 | | | | √ | | |
| FUNCTION 3 | | | √ | | | |
| FUNCTION 4 | | | | | √ | |
| FUNCTION 5 | | | | | | √ |

IMAGE FORMING APPARATUS TO EXECUTE USER AUTHENTICATION AND METHOD OF EXECUTING USER AUTHENTICATION IN IMAGE FORMING APPARATUS

CROSS-REFERENCE TO RELATED APPLICATIONS

This application claims priority under 35 U.S.C. §119(a) from Korean Patent Application No. 10-20100082089, filed on Aug. 24, 2010, in the Korean Intellectual Property Office, the disclosure of which is incorporated herein in its entirety by reference.

BACKGROUND OF THE INVENTION

1. Field of the Invention

The present general inventive concept relates to an image forming apparatus to execute user authentication and a method of executing user authentication in the image forming apparatus.

2. Description of the Related Art

With the frequent occurrence of security-related problems in the field of printing systems, user authentication is often executed with respect to functions provided by the systems. When a user uses a single account that supports a single password, all functions available to the user are protected by the single password. As a result, if the single password is compromised, all the functions for the user may be stolen and/or all the functions available to the user may be used by someone other than the user. Moreover, the use of the single password may not give the user the freedom to adjust the complexity of the password according to the security level of a function of the image forming apparatus, or the required protection level of personal information. Meanwhile, when the user uses a plurality of accounts, unnecessary resource consumption occurs, leading to inefficiency. Therefore, to execute user authentication in an image forming apparatus having a plurality of functions, there is a need for diversifying and differentiating user authentication.

SUMMARY OF THE INVENTION

The present general inventive concept provides an image forming apparatus to execute user authentication and a method of executing user authentication in the image forming apparatus, in which a plurality of passwords are provided to an account and password authentication is differentiated for each function.

Additional features and advantages of the present general inventive concept will be set forth in part in the description which follows and, in part, will be obvious from the description, or may be learned by practice of the general inventive concept.

According to a feature and utility of the present general inventive concept, there is provided an image forming apparatus to execute user authentication. The image forming apparatus includes an input unit through which user information is input, an account management unit including and to manage an account information database that stores user information corresponding to functions of the image forming apparatus, a user authentication unit to execute user authentication based on the user information input through the input unit by using the account information database, and a display unit to display a user interface where a function corresponding to the input user information is activated, in response to a result of the authentication.

According to another feature and utility of the present general inventive concept, there is provided an image forming apparatus to execute user authentication. The image forming apparatus includes an input unit through which a function and user information are input, an account management unit including and to manage an account information database that stores user information corresponding to functions of the image forming apparatus, a user authentication unit to execute user authentication based on the user information input through the input unit by using the account information database, and a function execution unit to execute the input function in response to a result of the authentication.

According to another feature and utility of the present general inventive concept, there is provided a method of executing user authentication in an image forming apparatus. The method includes receiving user information, executing user authentication with based on the received user information by using an account information database that stores user information corresponding to functions of the image forming apparatus, and displaying a user interface where a function corresponding to the received user information is activated, in response to a result of the authentication.

According to another feature and utility of the present general inventive concept, there is provided a method of executing user authentication in an image forming apparatus. The method includes receiving a function and user information, executing user authentication based on the received user information by using an account information database that stores user information corresponding to functions of the image forming apparatus, and executing the received function in response to a result of the authentication.

In still another feature and utility of the present general inventive concept, an image forming system to execute an image forming function according to an authentication procedure comprises an input unit to input at least one of a desired image forming function to be executed and authentication information of a user of the image forming system, and an image forming unit that executes an image forming function based on at least one of the input authentication information and the input desired image forming function:

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
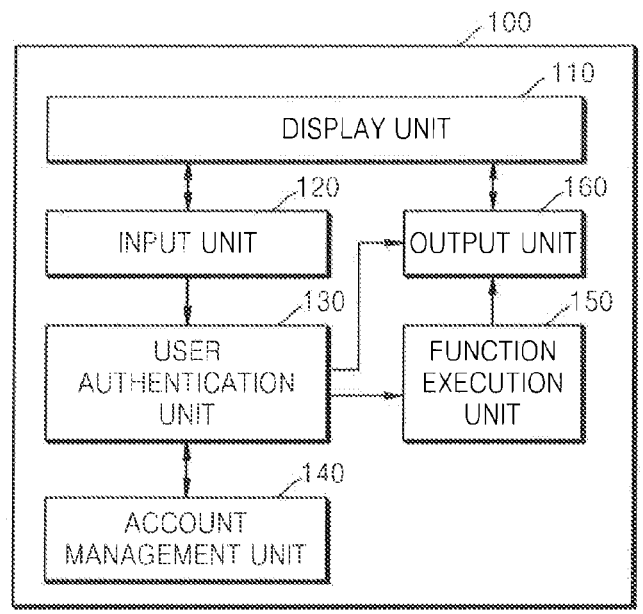
FIG. 1 is a block diagram of an image forming apparatus to execute user authentication according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 is a block diagram of an image forming apparatus 100 to execute user authentication according to a first exemplary embodiment of the present general inventive concept. The image forming apparatus 100 may include a display unit 110, an input unit 120, a user authentication unit 130, an account management unit 140, a function execution unit 150, and an output unit 160.

Figure 8:
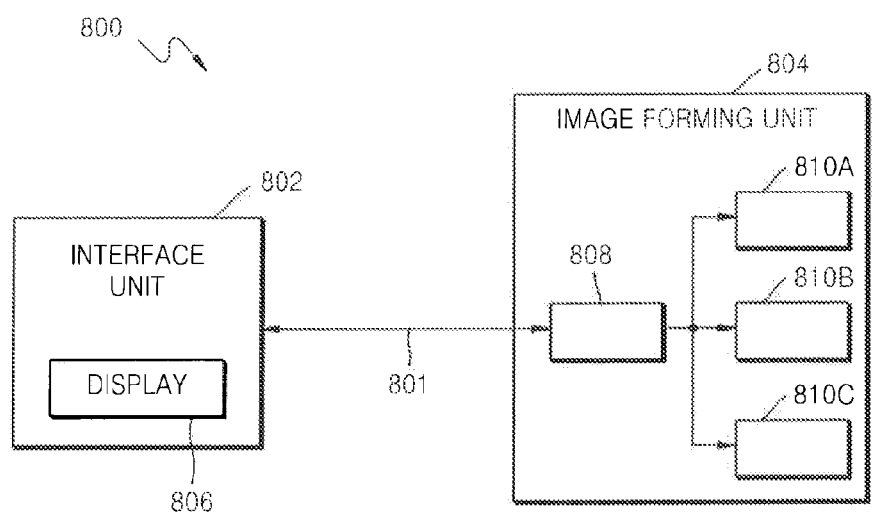
FIG. 8 is an image forming system to execute an image forming function based on an authentication procedure according to an exemplary embodiment of the present general inventive concept.

The display unit 110 displays a user interface that allows a user to select functions of the image forming apparatus 100. The user interface may include a window or image to be displayed on a screen of the display unit 110. The functions of the image forming apparatus 100 include, but are not limited to printing, scanning and faxing. Herein, the display unit 110 is generally a liquid crystal panel attached to the image forming apparatus 100, but may also be implemented in a device connected to the image forming apparatus 100 via a wired and/or wired communication interface 801, as illustrated in FIG. 8 discussed in greater detail below.

The input unit 120 may select a function that the user desires the image forming apparatus 100 to execute, via the user interface displayed on the display unit 110. Herein, the input unit 120 may be a touch panel attached to the display unit 110. Once the function is selected via the user interface, the display unit 110 accordingly displays a login interface that allows access to the image forming apparatus 100. Upon display of the login interface on the display unit 110, user information is input to the login interface through the input unit 120. Herein, the user information means a user identification (ID) and a password. After the function, the user ID, and the password are input through the input unit 120, they are delivered to the user authentication unit 130.

The user authentication unit 130 authenticates the user information by determining whether the function, the user ID, and the password being input through the input unit 120 match user information stored in an account information database of the account management unit 140 as discussed in greater detail below.

The account management unit 140 includes the account information database, which stores a mapping between functions executable in the image forming apparatus 100 and user IDs and passwords. Herein, the account information database may include a set of account information created by mapping at least one password to a user ID and mapping a function to each password. According to an exemplary embodiment of the present general inventive concept, the user sets account information and stores the set account information, thereby creating the account information database.

Figure 2:
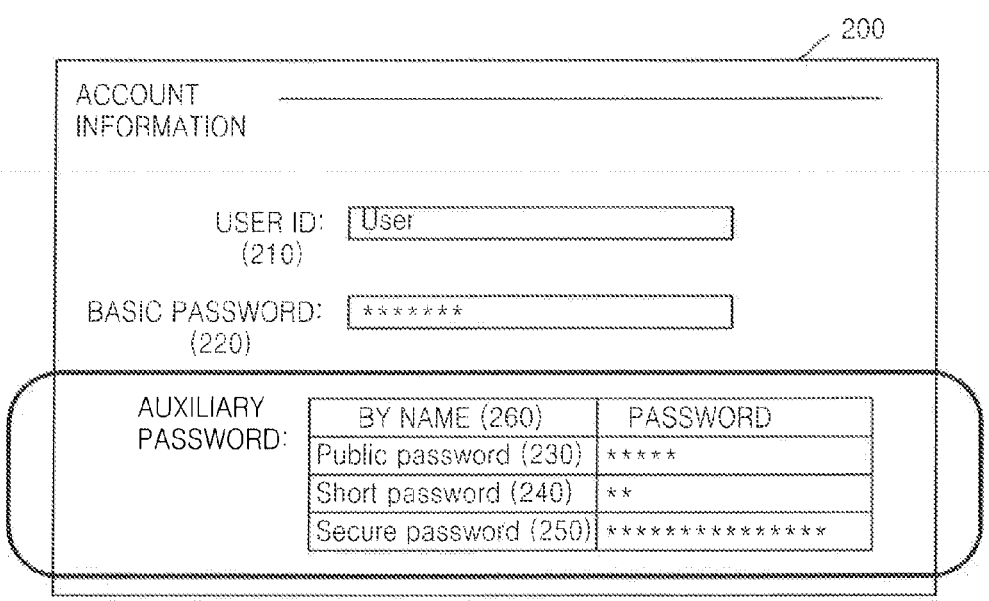
FIG. 2 illustrates a user interface to set account information to create an account information database according to an exemplary embodiment of the present general inventive concept.
Figures 3, 4:
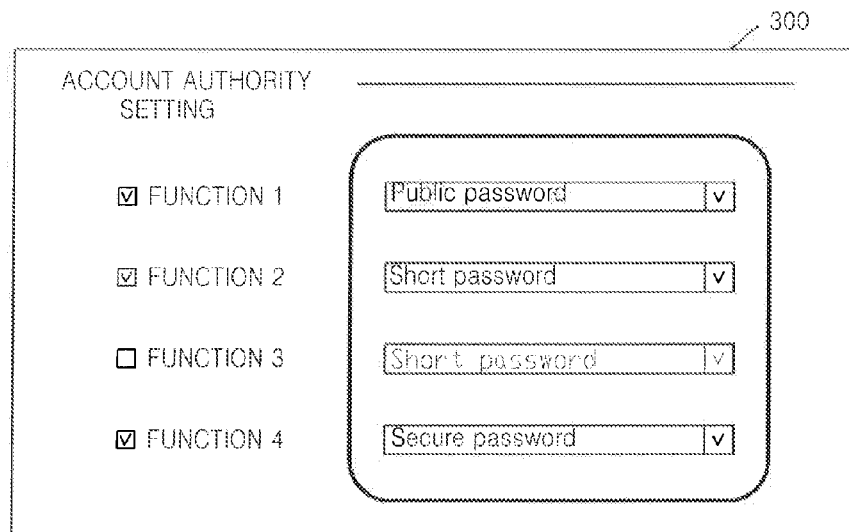
FIG. 3 illustrates a user interface to set a function corresponding to account information according to an exemplary embodiment of the present general inventive concept.
FIG. 4 illustrates an account information database created according to an exemplary embodiment of the present general inventive concept.

FIGS. 2 through 4 are diagrams for describing a process of creating an account information database according to an exemplary embodiment of the present general inventive concept. Hereinafter, the process of creating an account information database will be described with reference to FIGS. 2 through 4.

FIG. 2 illustrates a user interface 200 to set account information to create an account information database according to an exemplary embodiment of the present general inventive concept. According to an exemplary embodiment of the present general inventive concept, at least one password corresponding to a single user ID may be set through the user interface 200 illustrated in FIG. 2. As illustrated in FIG. 2, "User 1" may be set as a user ID 210 of a single user account and a basic password 220 and auxiliary passwords 230, 240, and 250 may be set as passwords corresponding to the user ID 210. Herein, the basic password 220 is a mandatory password that has to be set and the auxiliary passwords 230, 240, and 250 are optional passwords that may be selectively set. The three auxiliary passwords have been set in an exemplary embodiment of the present general inventive concept, but the number of auxiliary passwords that may be set is not particularly limited. However, when the basic password 220 and the auxiliary passwords 230, 240, and 250 are set in this way, the user may experience difficulty in memorizing the passwords as the number of passwords increases. Therefore, bynames 260 of the auxiliary passwords 230, 240, and 250 may be created as identifiers to identify the auxiliary passwords 230, 240, and 250. Through creation of the bynames 260 of the auxiliary passwords 230, 240, and 250, the user may easily identify the auxiliary passwords 230, 240, and 250 with the bynames 260. The user may additionally set an auxiliary password or delete an already set auxiliary password through the user interface 200 illustrated in FIG. 2, but may not delete the basic password 220.

FIG. 3 illustrates a user interface 300 to set a function corresponding to account information according to an exemplary embodiment of the present general inventive concept. Through the user interface 300, functions executable in the image forming apparatus 100 are mapped to passwords and thus different passwords may be set to different functions. For example, as illustrated in FIG. 3, "Public password" may be set as a password corresponding to "Function 1", "Short password" may be set as a password corresponding to "Function 2", and "Secure password" may be set as a password corresponding to "Function 4". In this way, the auxiliary passwords 230, 240, and 250 as well as the basic password 220 may be mapped to respective functions. According to an exemplary embodiment of the present general inventive concept, when an auxiliary password is deleted through the user interface 200 illustrated in FIG. 2, a function corresponding to the deleted password is automatically changed to correspond to the basic password 220. This is because, if another auxiliary password is not set to correspond to the function corresponding to the deleted auxiliary password during the deletion of the auxiliary password, the function corresponding to the deleted password cannot be used.

FIG. 4 illustrates an account information database 400 created according to an exemplary embodiment of the present general inventive concept. The account information database may be a lookup table (LUT), which corresponds passwords to image functions executable by the image forming, apparatus 100. By setting account information through the user interface 200 illustrated in FIG. 2 and a function corresponding to the account information through the user interface 300 illustrated in FIG. 3, an account information database 400 may be created as illustrated in FIG. 4, in which includes a user ID, a plurality of passwords, and functions corresponding to the plurality of passwords of a single account. While the account information database 400 shows account information of a single account "USER 1" in FIG. 4, it may also include account information of other accounts in the same form as illustrated in FIG. 4.

Referring back to FIG. 1, if the function, the user ID, and the password input through the input unit 120 match user information stored in the account information database of the account management unit 140, the user authentication unit 130 determines that the input user information succeeds in authentication. On the other hand, if the function, the user ID, and the password input through the input unit 120 do not exist in the account information database of the account management unit 140, the user authentication unit 130 determines that the input user information fails in authentication.

The user authentication unit 130 delivers the determination result to the function execution unit 150 and/or the output unit 160. In case of the success in authentication, the user authentication unit 130 requests the function execution unit 150 to execute the corresponding function. In case of the failure in authentication, the user authentication unit 130 generates and communicates authentication failure information to the output unit 160.

The function execution unit 150 executes the function at the request of the user authentication unit 130, and delivers the execution result to the output unit 160. Accordingly, the output unit 160 may alert a user via at least one of a sound, a displayed image and/or text, or a light indicator, indicating success and/or failure of the authentication.

The function execution unit 150 may also include individual function control modules that control a respective image function of the image forming apparatus 100. For example, the function execution unit 150 may include a printing module 150A, a scanning module 150B and/or facsimile module 150C. Accordingly, the printing module 150A controls printing of images, the scanning module 150B controls scanning of images, and the facsimile module 150C controls faxing of images. It is appreciated that the individual function control modules 150A-150C may be integrated in the function execution unit 150 as a single control module, or may be separate from and controlled by a main control module, as illustrated in FIG. 8 discussed below.

Image forming functions executable by each respective function control module 150A-150C of the function execution unit 150 may be mapped to passwords. Thus, different passwords may be set to operate respective function control modules 150A-150C. Accordingly, the user authentication unit 130 may communicate an authentication result to each function control module 150A-150C such that only the image forming function corresponding to the successful authentication is executed.

The output unit 160, upon receiving the authentication failure information from the user authentication unit 130, generates a message indicating the authentication failure. Upon receiving the execution result indicating the success in the execution of the requested function from the function execution unit 150, the output unit 160 generates a message indicating the function execution success. The output unit 160 outputs the generated message to the display unit 110. The display unit 110 then displays the received message.

Figure 5:
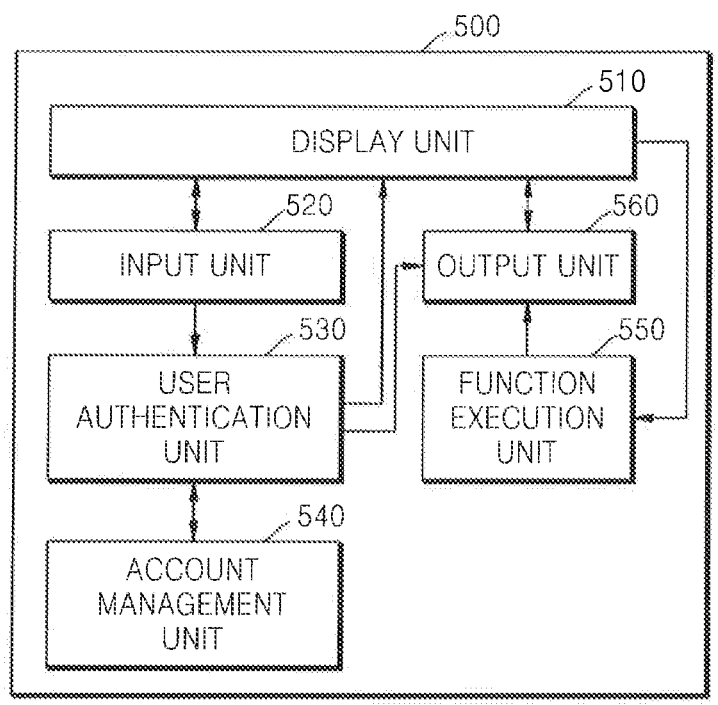
FIG. 5 is a block diagram of an image forming apparatus to execute user authentication according to an exemplary embodiment of the present general inventive concept.

FIG. 5 is a block diagram of an image forming apparatus 500 to execute user authentication according to a second exemplary embodiment of the present general inventive concept. The image forming apparatus 500 may include a display unit 510, an input unit 520, a user authentication unit 530, an account management unit 540, a function execution unit 550, and an output unit 560.

The image forming apparatus 500 to execute user authentication according to the second exemplary embodiment of the present general inventive concept includes similar components as the image forming apparatus 100 to execute user authentication according to the first exemplary embodiment of the present general inventive concept. However, process is different from that of the image forming apparatus 100.

Once a login interface to access the image forming apparatus 500 is displayed on the display unit 510, the user inputs a user ID and a password to the login interface through the input unit 520.

The account management unit 540 includes an account information database that stores a mapping between functions of the image forming apparatus 500 and user IDs and passwords.

The user authentication unit 530 authenticates the input user information by determining whether the user ID and the password input through the input unit 520 match user information stored in the account information database of the account management unit 540. That is, if the user ID and the password input through the input unit 520 exist in the account information database of the account management unit 540, the user authentication unit 530 determines that the input user information succeeds in authentication. On the other hand, if the user ID and the password input through the input unit 520 do not exist in the account information database of the account management unit 540, the user authentication unit 530 determines that input user information fails in authentication. In case of the success in authentication, the user authentication unit 530 displays a user interface where a function corresponding to the successfully authenticated user information is activated on the display unit 510. Thus, the user may request execution of the corresponding function through the user interface displayed on the display unit 510. In case of the failure in authentication, the user authentication unit 530 generates authentication failure information to the output unit 560.

Once the user interface where the corresponding function is activated is displayed on the display unit 510 and the user selects the displayed function through the input unit 520, a request to execute the selected function is output to the function execution unit 550. The function execution unit 550 then executes the requested function at the request of the input unit 520, and delivers the execution result to the output unit 560.

The output unit 560, upon receiving the authentication failure information from the user authentication unit 530, generates a message indicating the authentication failure and outputs the generated message to the display unit 510. The display unit 510 then displays the received message.

As described above, the image forming apparatus 100 to execute user authentication according to the first exemplary embodiment first selects a function to be executed and then executes user authentication, whereas the image forming apparatus 500 to execute user authentication according to the second exemplary embodiment first executes user authentication and then requests execution of a function in a user interface where a function corresponding to the successfully authenticated user information is activated.

Figure 6:
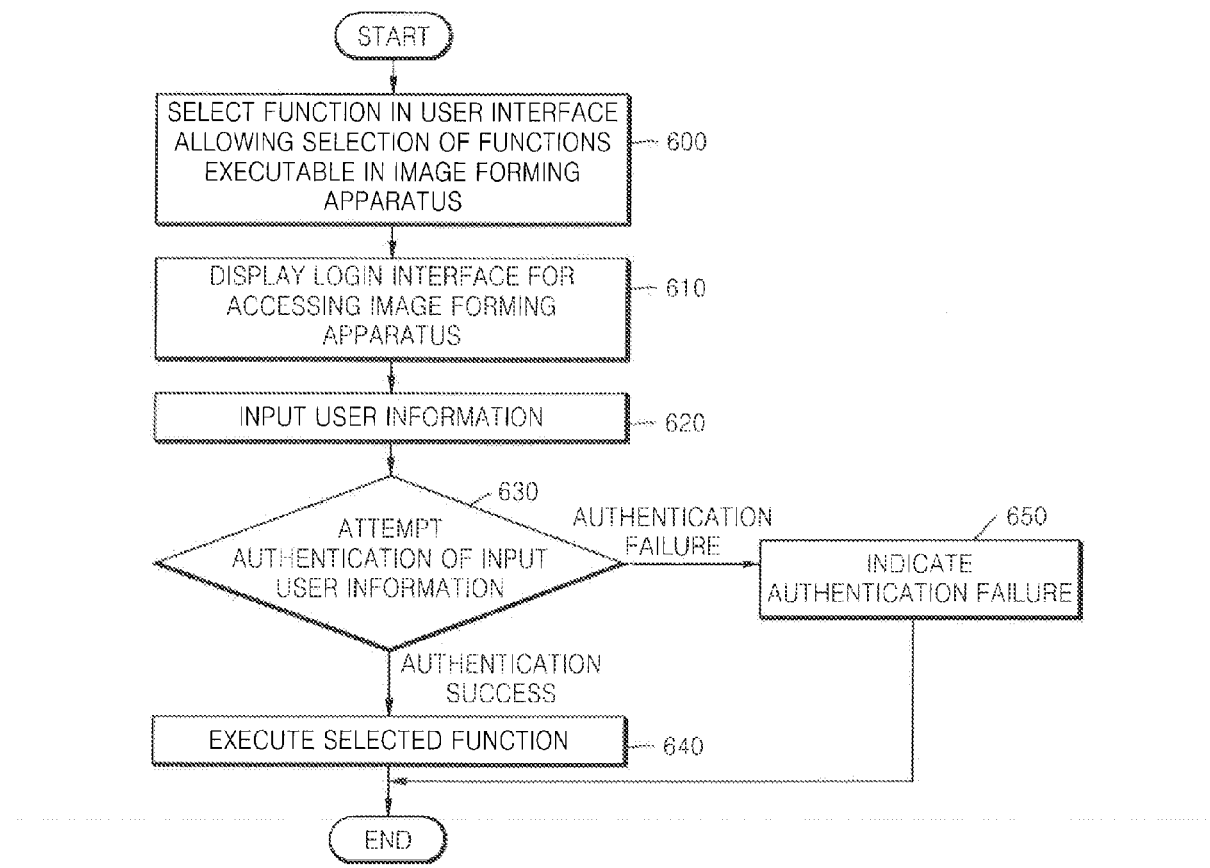
FIG. 6 is a flowchart illustrating a method of executing user authentication in an image forming apparatus according to the first exemplary embodiment of the present general inventive concept.

FIG. 6 is a flowchart illustrating a method of executing user authentication in an image forming apparatus according to the first exemplary embodiment of the present general inventive concept. Hereinafter, with reference to the image forming apparatus 100 illustrated in FIG. 1, the method of executing user authentication according to the first exemplary embodiment will be described.

In operation 600, a function is selected on a user interface that allows selection of functions executable in the image forming apparatus 100. Once the user interface allowing selection of the functions of the image forming apparatus 100 is displayed on the display unit 110, the function is selected through the input unit 120.

In operation 610, a login interface to access the image forming apparatus 100 is displayed.

In operation 620, user information is input to the displayed login interface. Herein, the user information means a user ID and a password.

In operation 630, authentication of the input user information is attempted. According to the first exemplary embodiment of the present general inventive concept, authentication of the input user information may be executed by determining whether the selected function and the user ID and the password match user information stored in an account information database. Herein, the account information database means a set of account information created by mapping at least one password to a user ID and mapping a function to each password. The account information database may be created by the user through the user interface 200 illustrated in FIG. 2 and the user interface 300 illustrated in FIG. 3. The generated account information database is as illustrated in FIG. 4. If the selected function and the user information exist in the account information database, it is determined that the user information succeeds in authentication. On the other hand, if the selected function and the user information do not exist in the account information database, it is determined that the user information fails in authentication. In case of the success in authentication, the process goes to operation 640; whereas in case of the failure in authentication, the process goes to operation 650.

In operation 640, the selected function is executed when authentication of operation 630 is successful. That is, the function selected in operation 600 may be executed. However, if the authentication of operation 630 fails, the authentication failure is indicated in operation 630, and the method ends. The authentication may be indicated by alerting a user via the display unit, a sound and/or a light indicator.

Figure 7:
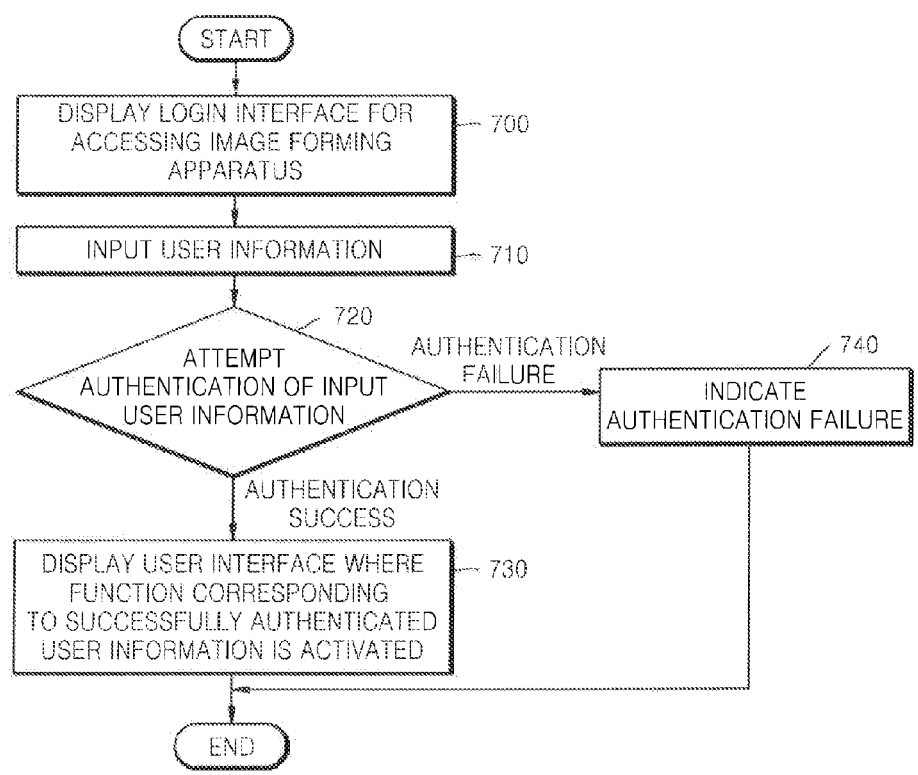
FIG. 7 is a flowchart illustrating a method of executing user authentication in an image forming apparatus according to an exemplary embodiment of the present general inventive concept.

FIG. 7 is a flowchart illustrating a method of executing user authentication in an image forming apparatus according to the second exemplary embodiment of the present general inventive concept.

In operation 700, a login interface to access the image forming apparatus is displayed.

In operation 710, user information is input to the login interface. Herein, the user information means a user ID and a password.

In operation 720, authentication of the input user information is attempted. According to the second exemplary embodiment, authentication of the input user information may be executed by determining whether the input user ID and input password match user information stored in an account information database. Herein, the account information database means a set of account information created by mapping at least one password to a user ID and mapping a function to each password. If the input user information exists in the account information database, it is determined that the user information succeeds in authentication. On the other hand, if the input user information does not exist in the account information database, it is determined that the user information fails in authentication. In case of the success in authentication, the process goes to operation 730; whereas in case of the failure in authentication, the process goes to operation 740.

In operation 730, a user interface where a function corresponding to the successfully authenticated user information is activated is displayed. Thus, the user may select the function on the displayed user interface and execute the selected function. However, if the authentication of operation 720 fails, the authentication failure is indicated in operation 740, and the method ends. The authentication may be indicated by alerting a user via the display unit, a sound and/or a light indicator.

Referring now to FIG. 8, an image forming system 800 to execute an image forming function according to an authentication procedure is illustrated. The image forming system 800 may include an interface unit 802, an image forming unit 804, and a display unit 806. Although the display unit 806 is illustrated as being integrated with the interface unit 802, it is appreciated that the display unit 806 may be separate from the interface unit 802, while still controllable by the interface unit 802.

The interface unit 802 may input at least one of a desired image forming function to be executed and authentication information of a user of the image forming system 800, similar to the interface described above with respect to FIGS. 2 and 3.

The image forming unit 804 communicates with the interface unit 802 to execute an image forming function based on at least one of the authentication information and the desired image forming function input via the interface unit 802. The image forming unit 804 may communicate with the interface unit 802 in a wireless and/or wired manner. Further, the image forming unit 804 may include an authentication control module 808, and one or more image function control modules 810A-810C. For example, the image function control modules may include a printing control module 810A, a scanning control module 810B, and a facsimile control module 810C. The authentication control module 808 may initiate one or more of the image function control modules 810A-810C based on based on at least one of the authentication information and the desired image forming function input via the interface unit 802.

For example, a user may input a desired image forming function to be executed. Based on the desired image forming function input via the interface unit 802, the authentication module 808 may determine that specific authentication information is required before a corresponding image function control module 810A-810C is initiated to perform the desired image forming function. Accordingly, the authentication control module 808 may request authentication information before executing the desired image forming function. If the input authentication information is successfully verified, then the authentication module 808 may initiate the corresponding image function control module 810A-810C, and the desired image forming function is performed.

Similar to operation above, the image forming unit 804 may also request input of a desired image forming function, prior to executing an image forming function, based on authentication information input by the user. Accordingly, if a desired image forming function is successfully verified as corresponding to the input authentication information, then the authentication module 808 may initiate the corresponding image function control module 810A-810C, and the desired image forming function is performed.

Additionally, the input forming unit 804 may authenticate a user based on authentication information input via the interface unit 802. Based on the user that is authenticated, the image forming unit 804 may control the display unit 806 to display at least one authorized image forming function that may be executed based on the authenticated user. Upon a user's selection of one of the displayed image forming functions via the interface unit 802, the authentication module 808 initiates a corresponding image function control module 810A-810C, which then executes the selected authorized image forming function.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An image forming apparatus to execute user authentication, the image forming apparatus comprising:
    an input unit through which user information comprising a user identification (ID) and a password is input;
    an account management unit to create an account information database by mapping at least one password to a single user ID and mapping at least one respective function of the image forming apparatus to each password and to manage the account information database included therein that stores user information corresponding to all functions of the image forming apparatus, the functions including at least one of printing, scanning, and faxing;
    a user authentication unit to execute user authentication based on the user information input through the input unit by using the account information database to activate the one or more respective functions based on the input user ID and password according to the mapping of the single user ID and one of a plurality of passwords in the account information database; and
    a display unit to display a user interface where the one or more respective functions corresponding to the input user information is activated in response to a result of the authentication.

2. The image forming apparatus of claim 1, wherein the account management unit creates the account information database by adding an identifier corresponding to each password as a byname which identifies the password to the user.

3. The image forming apparatus of claim 1, wherein the user authentication unit executes user authentication with respect to the user information input through the input unit by determining whether the input user information matches user information stored in the account information database.

4. The image forming apparatus of claim 1, further comprising a function execution unit to execute the function selected in the user interface displayed on the display unit.

5. The image forming apparatus of claim 4, wherein the display unit displays a result of the authentication.

6. The image forming apparatus of claim 1, wherein the account management unit manages the account information database including a basic password which is mandatory and at least one auxiliary password.

7. The image forming apparatus of claim 6, wherein the account management unit deletes one of the auxiliary passwords and automatically changes the mapping of the respective function onto the basic password.

8. An image forming apparatus to execute user authentication, the image forming apparatus comprising:
    an input unit through which a function and user information comprising a user identification (ID) and a password are input;
    an account management unit to create an account information database by mapping at least one password to a single user ID and mapping at least one respective function of the image forming apparatus to each password and to manage the an account information database that stores user information corresponding to all functions of the image forming apparatus, the functions including at least one of printing, scanning, and faxing;
    a user authentication unit to execute user authentication with respect to the user information input through the input unit by using the account information database to activate the one or more respective functions based on the input user ID and password according to the mapping of the single user ID and one of a plurality of passwords in the account information database; and
    a function execution unit to execute the input function according to a result of the authentication.

9. The image forming apparatus of claim 8, wherein the account management unit creates the account information database by adding an identifier corresponding to each password as a byname which identifies the password to the user.

10. The image forming apparatus of claim 8, wherein the user authentication unit executes user authentication based on the user information input through the input unit by determining whether the input user information matches user information stored in the account information database.

11. A method of executing user authentication in an image forming apparatus, the method comprising:
    receiving user information comprising a user identification (ID) and a password;
    executing user authentication based on the received user information by using an account information database, created by mapping at least one password to a single user ID and mapping at least one respective function of the image forming apparatus to each password, that stores user information corresponding to functions of the image forming apparatus, the functions including at least one of printing, scanning, and faxing, to activate the one or more respective functions based on the input user ID and password according to the mapping of the single user ID and one of a plurality of passwords in the account information database; and
    displaying a user interface where the one or more respective functions corresponding to the received user information is activated, in response to a result of the authentication.

12. The method of claim 11, wherein the executing of the user authentication comprises executing user authentication based on the received user information by determining whether the received user information matches user information stored in the account information database.

13. A method of executing user authentication in an image forming apparatus, the method comprising:
   receiving a function and user information comprising a user identification (ID) and a password;
   executing user authentication based on the received user information by using an account information database, created by mapping at least one password to a single user ID and mapping at least one respective function of the image forming apparatus to each password, that stores user information corresponding to functions of the image forming apparatus, the functions including at least one of printing, scanning, and faxing, to activate the one or more respective functions based on the input user ID and password according to the mapping of the single user ID and one of a plurality of passwords in the account information database; and
   executing the received function in response to a result of the authentication.

14. The method of claim 13, wherein the executing of the user authentication comprises executing user authentication based on the received user information by determining whether the received user information matches user information stored in the account information database.

15. A non-transitory computer readable medium including operations to perform a method of executing user authentication in an image forming apparatus, the method comprising:
   receiving a function and user information comprising a user identification (ID) and a password;
   executing user authentication based on the received user information by using an account information database, created by mapping at least one password to a single user ID and mapping at least one respective function of the image forming apparatus to each password, that stores user information corresponding to functions of the image forming apparatus, the functions including at least one of printing, scanning, and faxing, to activate the one or more respective functions based on the input user ID and password according to the mapping of the single user ID and one of a plurality of passwords in the account information database; and
   executing the received function in response to a result of the authentication.

* * * * *

UNITED STATES PATENT AND TRADEMARK OFFICE
CERTIFICATE OF CORRECTION

PATENT NO. : 8,997,212 B2
APPLICATION NO. : 13/152439
DATED : March 31, 2015
INVENTOR(S) : Byoung-yue Kim It is certified that error appears in the above-identified patent and that said Letters Patent is hereby corrected as shown below:

Specification

Column 1, Line 11

Delete "10-20100082089," and insert --10-2010-0082089,--, therefor.

Claims

Claim 8, Column 10, Line 26

Delete "the an" and insert --the--, therefor.

Signed and Sealed this
Twenty-fourth Day of November, 2015

Michelle K. Lee
*Director of the United States Patent and Trademark Office*